(12) United States Patent
Tanioka et al.

(10) Patent No.: US 7,576,456 B2
(45) Date of Patent: Aug. 18, 2009

(54) LINEAR ACTUATOR

(75) Inventors: Nozomu Tanioka, Nagano-ken (JP); Akira Akahane, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 24 days.

(21) Appl. No.: 11/820,673

(22) Filed: Jun. 20, 2007

(65) Prior Publication Data

US 2008/0024015 A1      Jan. 31, 2008

(30) Foreign Application Priority Data

Jul. 31, 2006     (JP)     ............................. 2006-207320

(51) Int. Cl.
  *H02K 33/00* (2006.01)
  *H02K 33/18* (2006.01)
(52) U.S. Cl. .............................. 310/14; 310/12; 310/13; 310/15; 310/16; 310/17; 310/68 R; 369/44.14
(58) Field of Classification Search ............ 310/12–17, 310/68 R; 369/44; 359/814, 823; *H02K 33/00, H02K 33/18*
See application file for complete search history.

(56) References Cited

U.S. PATENT DOCUMENTS

| 4,864,170 | A | * | 9/1989 | Eguchi | ....................... | 310/12 |
|---|---|---|---|---|---|---|
| 4,960,321 | A | * | 10/1990 | Takahashi | ................... | 359/823 |
| 5,229,669 | A | * | 7/1993 | Takei | ........................... | 310/12 |
| 5,373,496 | A | * | 12/1994 | Tomita et al. | ............... | 720/682 |
| 5,659,433 | A | * | 8/1997 | Marino et al. | ............... | 359/813 |
| 5,892,747 | A | * | 4/1999 | Okada et al. | ................ | 720/647 |
| 6,163,090 | A | * | 12/2000 | Brown et al. | .................. | 310/12 |
| 6,385,156 | B1 | * | 5/2002 | Furukawa et al. | ........... | 369/100 |
| 6,452,895 | B1 | * | 9/2002 | Kawano | ..................... | 720/681 |
| 6,567,352 | B1 | * | 5/2003 | Inui et al. | ................ | 369/44.21 |
| 6,680,883 | B2 | * | 1/2004 | Inui et al. | ................ | 369/44.14 |
| 6,859,325 | B2 | * | 2/2005 | Kato et al. | ................... | 359/618 |
| 2004/0052170 | A1 | * | 3/2004 | Ikeda et al. | .............. | 369/44.21 |
| 2004/0245861 | A1 | * | 12/2004 | Miyajima et al. | ............. | 310/12 |
| 2006/0055252 | A1 | * | 3/2006 | Tseng | .......................... | 310/14 |
| 2006/0250029 | A1 | * | 11/2006 | Kelly et al. | .................... | 310/12 |

* cited by examiner

*Primary Examiner*—Quyen Leung
*Assistant Examiner*—John K Kim
(74) *Attorney, Agent, or Firm*—Flynn, Thiel, Boutell & Tanis, P.C.

(57) ABSTRACT

In a linear actuator (1), on the inside of a rectangular tubular movable element (3), a linear guide (14) that supports the movable element (3) so as to be linearly movable is positioned at a center of the movable element (3), and a position detecting mechanism (20) and load attaching member (13) that sandwich the linear guide are disposed linearly in a vertical direction. This arrangement enables a center of gravity of the movable element (3) to be matched with a center of the linear guide (14). A magnetic circuit is in a bilaterally symmetrical relationship with regard to the center of the movable element (3). Therefore, a center of a thrust force that acts upon the movable element (3) is matched with the center of the movable element (3). The center of the thrust force that acts upon the movable element (3), the center of gravity of the movable element (3), and the center of the linear guide (14) are positioned at the center of the movable element (3). Resistance to sliding in the movable element (3) can be reduced without unreasonable stress being placing on the linear guide (14). Therefore, a magnetically driven linear actuator that has highly precise positioning and that is durable can be realized.

9 Claims, 7 Drawing Sheets

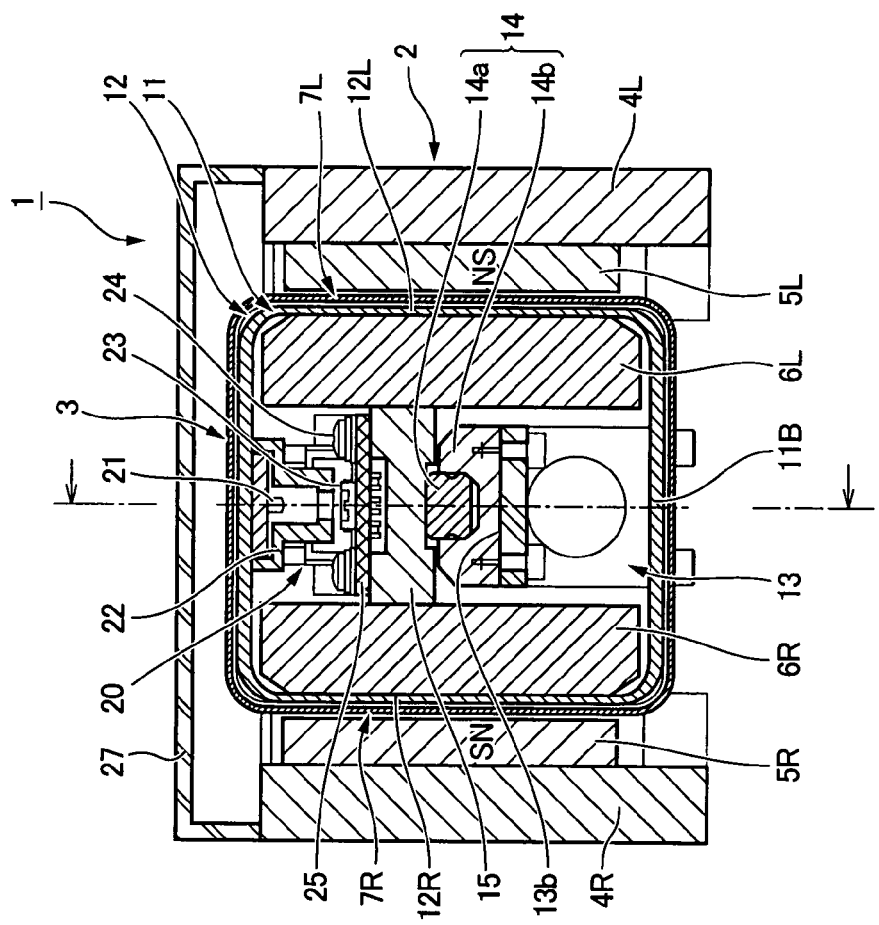

(SENSOR PART STRUCTURE)

(METHOD FOR ANCHORING THE FLEXIBLE CABLE)

LINEAR ACTUATOR

TECHNICAL FIELD

The present invention relates to a magnetically driven linear actuator for providing linear movement using a voice coil motor. Specifically, the present invention relates to improvements in the durability and highly precise positioning of a linear actuator that must be highly responsive and highly precise in positioning.

BACKGROUND ART

Linear actuators in which a lens or the like is moved using a voice coil motor to perform focusing or the like with high responsiveness are in widespread use. In a magnetically driven linear actuator, a movable element is supported by a linear guide or the like in a linearly movable state. A load attaching member for attaching a lens or other object to be driven is anchored to the movable element.

DISCLOSURE OF THE INVENTION

Generally, in a magnetically driven linear actuator, a load member must be moved linearly over a very small range with high responsiveness and highly precise positioning.

It is an object of the present invention to achieve improvements in the positioning precision and the durability of the magnetically driven linear actuator.

In order to achieve the above-described object, according to the present invention there is provided a linear actuator having a tubular movable element in which a driving coil is wound around an outer peripheral surface of a tubular coil frame in a peripheral direction thereof, and an anchoring element that is provided with a magnet disposed opposite the driving coil across a fixed gap, wherein an excitation current of the driving coil is controlled, whereby the movable element is moved in linear fashion in a direction of a central axial line of the movable element, characterized in comprising:

a linear guide that is disposed inside the coil frame and that supports the movable element so as to allow movement along the central axial line thereof;

a load attaching member attached to an inner peripheral surface of the coil frame; and a position detecting mechanism disposed inside the coil frame in order to detect a movement position of the movable element; wherein when the linear actuator is cut in a plane perpendicular to the central axial line of the movable element, the linear guide is positioned on the central axial line; and the linear guide, load attaching member, and position detecting mechanism are linearly arranged; and a center of gravity of the movable element and a center of the linear guide are matched with one another.

The linear actuator of the present invention is characterized in that a center of a thrust force that acts upon the movable element and the center of gravity of the movable element are matched with one another.

When the linear guide comprises a linear guide rail and a linear guide block that can be moved linearly along the linear guide rail, the linear guide rail is attached to the anchoring element in a state of being matched with the central axial line; and the linear guide block is attached to the load attaching member, which is attached to the coil frame.

When the position detecting mechanism comprises a light-emitting part and a light-receiving part that are disposed facing each other between the coil frame and the linear guide rail, the light-emitting part is attached to the inner peripheral surface of the coil frame; and the light-receiving part is attached to the linear guide rail.

In the linear actuator of the present invention, the center of gravity of the movable element and the center of the linear guide are matched with one another. Therefore, momentum that is generated by the weight of the movable element and that acts upon the movable element can be reduced. When the center of the thrust force that acts upon the movable element and the center of the linear guide are matched with one another, the momentum resulting from the thrust force that acts upon the linear guide can be reduced. Therefore, in the linear actuator of the present invention, unreasonable stress can be prevented from being placed on the linear guide or can be minimized, and resistance to sliding in the movable element due to the linear guide can be reduced. As a result, the movable element can be moved with high responsiveness and can be positioned with favorable precision. In addition, the durability of the linear actuator can also be improved because unreasonable stress is not placed on the linear guide and the like.

In the linear actuator of the present invention, the anchoring element comprises a pair of outer yokes disposed on either side of the movable element, a pair of magnets, and a pair of inner yokes that are disposed opposite the magnets from the inside of the movable element;

protruding parts are formed on inside surfaces of the outer yokes by causing both end parts of the outer yokes in the movement direction of the moveable element to protrude toward the movable element, and an area between the protruding parts is a concave part having a fixed depth and having a width that encompasses a range of movement of the movable element;

the magnet are attached to the concave parts, both end parts of an outside surface of the inner yokes are attached from the inside to the protruding parts on both sides;

the coil frame and driving coil of the movable element are disposed so as to pass through a gap formed between the magnets and the outside surfaces of the inner yokes; and closed magnetic paths are formed that pass from the magnets and through the outer yokes, pass from both of the protruding parts and through the inner yokes, and return to the magnets.

When the thus closed magnetic circuits are formed, a fixed thrust force is obtained regardless of the movement position of the movable element.

If an edge part of the coil frame can come into contact with end surfaces of the protruding parts of the outer yokes on the concave part side when the movable element moves a predetermined amount, a mechanism for stopping the movable element is formed by the end surfaces of the protruding parts and the edge parts on both sides of the coil frames.

Cushioning elastic members are preferably attached to the end surfaces of the protruding parts.

The position detecting mechanism of the present invention is characterized in comprising a light-emitting part provided with an LED that is attached to the movable element, and a light-receiving part provided with a semiconductor position sensitive detector that is attached to the anchoring element; wherein a light-receiving surface of the semiconductor position sensitive detector is arranged in the movement direction of the movable element; and a position of a center of gravity of illuminating light from the LED for directly illuminating the light-receiving surface is detected.

In the present invention, illuminating light from the LED mounted on the movable element directly illuminates the light-receiving surface of the semiconductor position sensitive detector without passing through a reflective member, transmissive member, or the like. Therefore, error factors caused by passage through a reflective member or a transmissive member are non-existent, for which reason the detection output will have lower drift, and higher precision can be achieved.

An emission side of the LED is covered by a mask provided with a slit that has a fixed width and extends in a direction perpendicular to the movement direction of the movable element; and linear illuminating light that has passed through the slit illuminates the light-receiving surface of the semiconductor position sensitive detector. Doing so will enable the detection range of the semiconductor position sensitive detector to be made larger than in instances wherein emitted light from the LED illuminates the light-receiving surface in an unaltered state.

The present invention is also characterized in further comprising an electricity-supplying flexible cable extending in a bent state between the light-emitting part and the anchoring element; wherein one end of the flexible cable is a movable side connecting end that is connected to the light-emitting part, and the other end is an anchored side connecting end that is connected to the anchoring element; a portion of the flexible cable between the movable side connecting end and the bent portion is anchored to the movable element via an elastic member; and a portion between the anchored side connecting end and the bent part is anchored to the anchoring element via an elastic member.

The elastic member prevents the force that acts upon the bent part of the flexible cable from being directly transmitted to the movable side connecting end or anchored side connecting end. The force that acts upon the connecting ends is cushioned by the elastic member. Therefore, the bent part can be bent so as to be highly curved, and the connecting portion of the flexible cable can be made more reliable.

The present invention is also characterized in that a position of the coil frame and driving coil where the light-emitting part of the movable element is attached is covered by a light-shielding sensor cover attached to the anchoring element; and an outer peripheral side at a position of the coil frame and driving coil where the load attaching part of the movable element is attached is in an open state. If part of the movable element is left in an open state, air will come into contact with the driving coil of the movable element in conjunction with the movement of the movable element, and the driving coil will be efficiently cooled.

In the linear actuator of the present invention, the center of gravity of the movable element and the center of the linear guide are matched with one another. Therefore, momentum that is generated by the weight of the movable element and that acts upon the movable element can be reduced. When the center of the thrust force that acts upon the movable element and the center of the linear guide are matched with one another, the momentum resulting from the thrust force that acts upon the linear guide can be reduced. Therefore, in the linear actuator of the present invention, unreasonable stress can be prevented from being placed on the linear guide or can be minimized, and resistance to sliding in the movable element due to the linear guide can be reduced. As a result, the movable element can be moved with high responsiveness and can be positioned with favorable precision. In addition, the durability of the linear actuator can also be improved because unreasonable stress is not placed on the linear guide and the like.

BRIEF DESCRIPTION OF THE DRAWINGS

FIGS. 3(a) and 3(b) are a longitudinal cross-sectional view and a lateral cross-sectional view of the linear actuator of FIG. 1;

BEST MODE FOR CARRYING OUT THE INVENTION

Embodiments of a magnetically driven linear actuator according to the present invention shall be described below with reference to the drawings.

Figure 1:
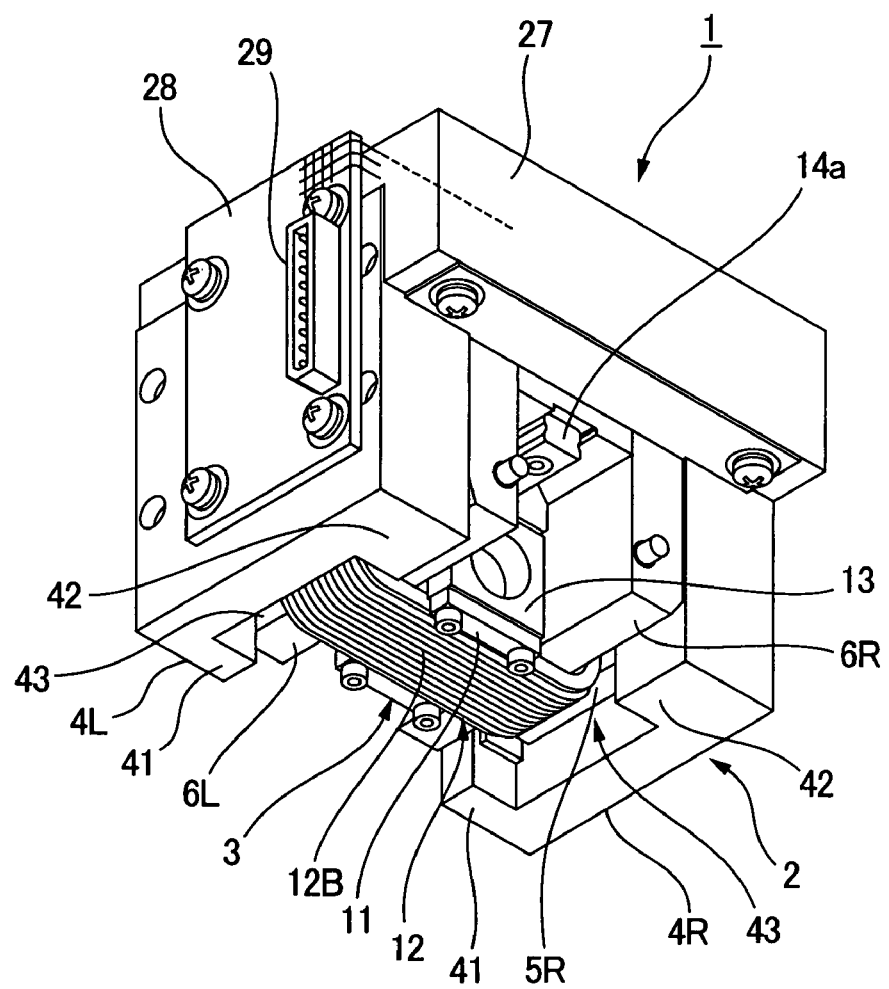
FIG. 1 is an external perspective view showing a linear actuator according to the present invention as seen from below a rear.
Figure 2:
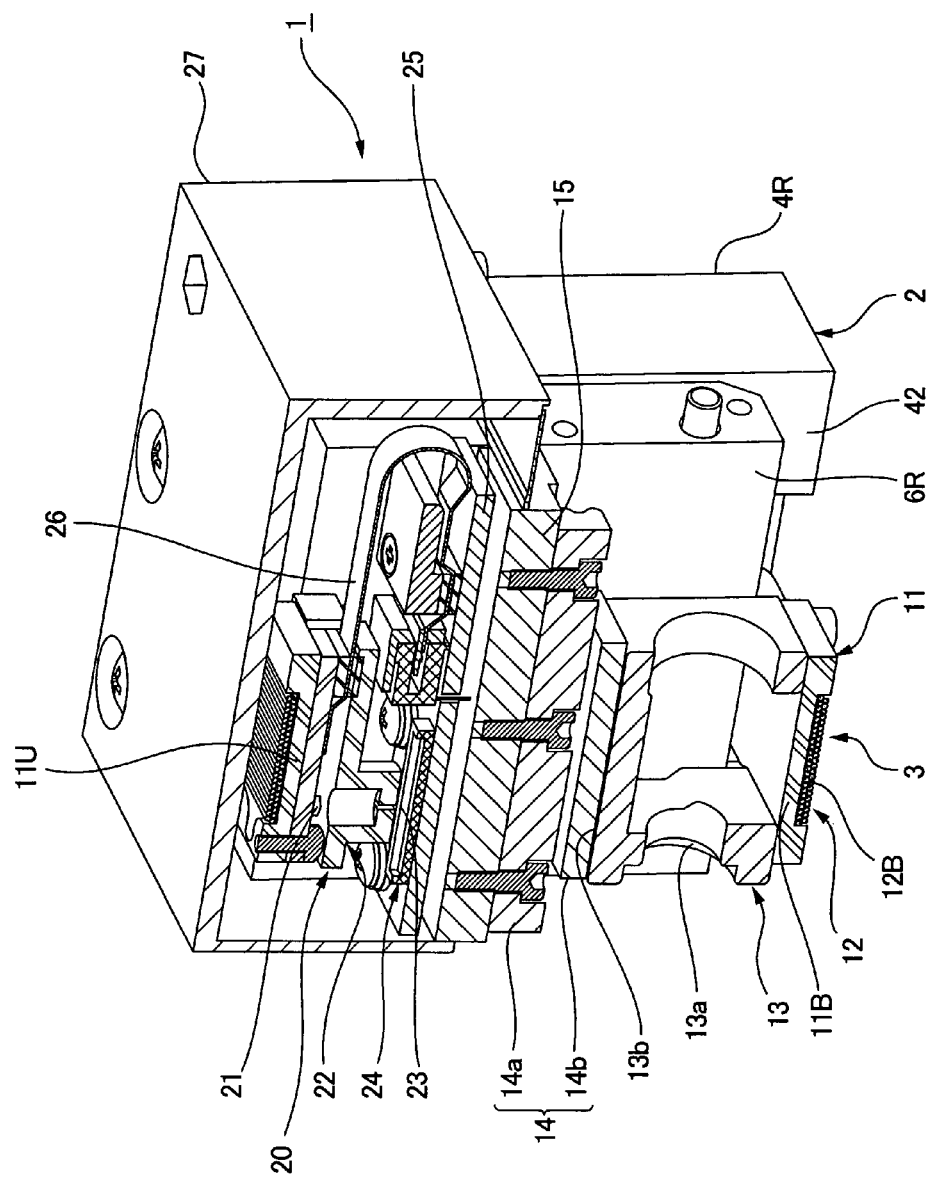
FIG. 2 is a perspective view showing a longitudinal section of the linear actuator of FIG. 1.
Figure 4A:
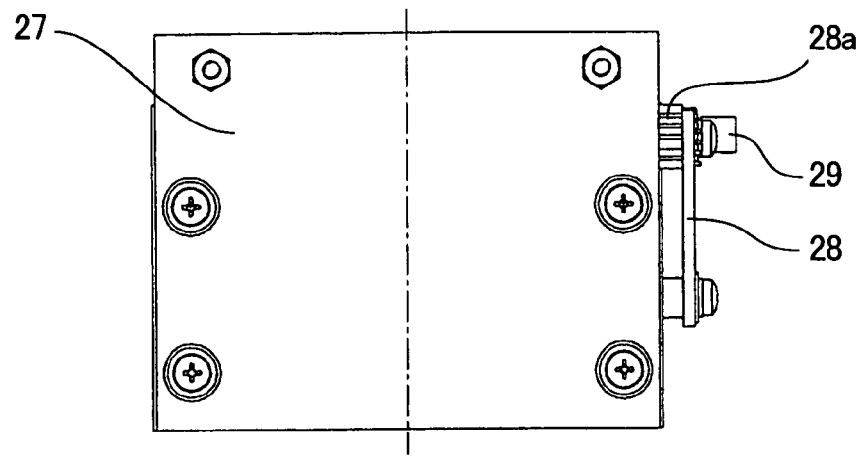
FIGS. 4(a) through 4(c) are a plan view, front view, and bottom view of the linear actuator of FIG. 1.
Figure 4B:
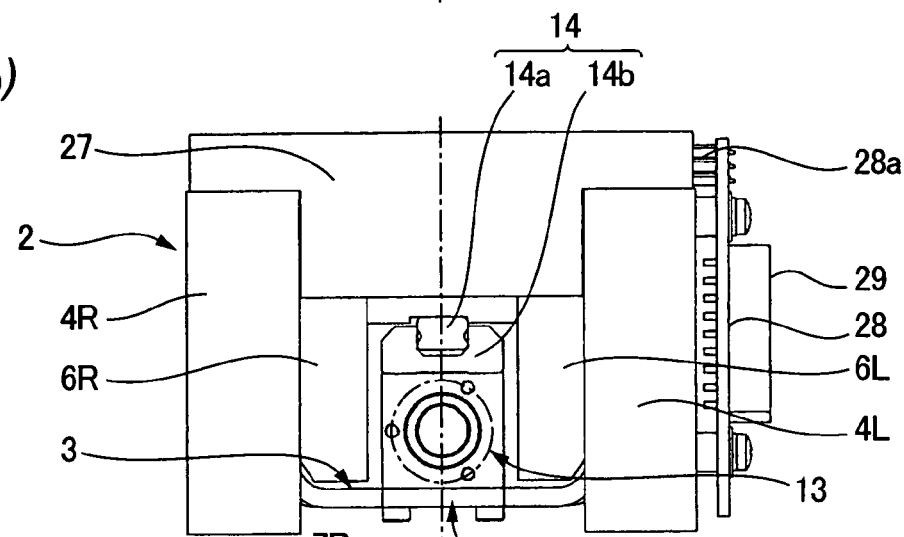
Figure 4C:
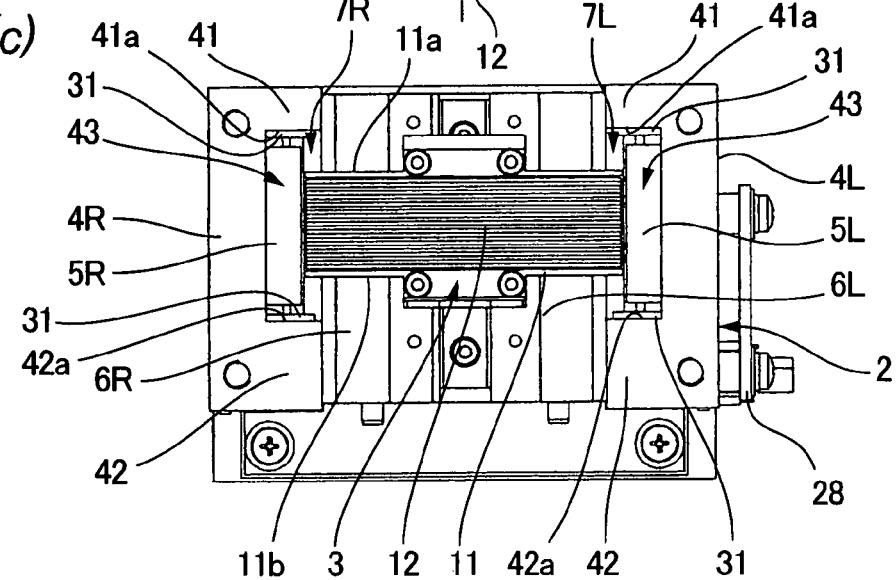

FIG. 1 is an external perspective view showing a linear actuator according to the present invention as seen from below a rear. FIG. 2 is a perspective view showing a longitudinal section of the linear actuator of FIG. 1. FIGS. 3(a) and 3(b) are a longitudinal cross-sectional view and a lateral cross-sectional view of the linear actuator of FIG. 1. FIGS. 4(a) through 4(c) are a plan view, front view, and bottom view of the linear actuator of FIG. 1.

A linear actuator 1 is composed of a voice coil motor comprising an anchoring element 2 and a movable element 3. The anchoring element 2 comprises a left and right pair of outer yokes 4L, 4R disposed perpendicularly, a left and right pair of permanent magnets 5L, 5R, and a left and right pair of inner yokes 6L, 6R. The outer yokes 4L, 4R are composed of rectangular plates of a fixed thickness that extend in a longitudinal direction. Front and rear end parts of inside surfaces of the outer yokes are protruding parts 41, 42 that protrude inward. A concave part 43 that has a fixed depth and that extends in a vertical direction is formed between the protruding parts. The rectangular plate-shaped permanent magnets 5L, 5R are attached in the concave part 43.

The inner yokes 6L, 6R are anchored to the outer yokes 4L, 4R while front and rear ends of the inner yokes are in proximity to the front and rear protruding parts 41, 42. The concave part 43 has a depth greater than the thickness of the permanent magnets 5L, 5R. Therefore, a gap 7L that has a fixed width and that extends in the longitudinal direction is formed between the permanent magnet 5L and the inner yoke 6L that faces the permanent magnet. Similarly, a gap 7R that has a fixed width and that extends in the longitudinal direction is formed between the permanent magnet 5R and the inner yoke 6R that faces the permanent magnet.

The movable element 3 has an overall shape resembling a rectangular tube and is disposed between the left and right pair of permanent magnets 5L, 5R. In the movable element 3, a driving coil 12 is wound along an external peripheral surface of a rectangular tubular-shaped coil frame 11 in a peripheral direction of the coil frame. Left and right perpendicular edges 12L, 12R of the driving coil 12 that are wound in a shape resembling a rectangular tube pass through the gaps 7L, 7R between the permanent magnets 5L, 5R and the inner yokes 6L, 6R, and face the left and right permanent magnets 5L, 5R with a fixed gap formed therebetween. The permanent magnets 5L, 5R are configured so that, e.g., inside surfaces are N poles and outside surfaces are S poles. When an excitation current is supplied to the driving coil 12, a magnetic force moving in a direction of a central axial line 3a of the movable element is generated in the movable element 3 in accordance with the energizing direction.

A load attaching member 13 is attached to an inner peripheral surface of a lower edge 11B of the coil frame 11 of the movable element 3. The load attaching member 13 is, e.g., a lens holder. A circular open part 13a is formed as a lens-attaching surface on a rear end part of the load attaching member. A linear guide 14 is disposed on an upper side of the load attaching member 13. The movable element 3 is supported on the anchoring element 2 side via the linear guide 14 in a state of being able to move linearly in a reciprocating fashion along the central axial line 3a.

The linear guide 14 comprises a linear guide rail 14a disposed along the movement direction of the movable element 3, and a linear guide block 14b attached to the linear guide rail 14a in a state of being able to slide along the linear guide rail 14a. The linear guide rail 14a is anchored to a surface of a support plate 15 extending between the left and right inner yokes 6L, 6R on the anchoring element 2 side. In contrast, the linear guide block 14b is anchored by a bolt to a horizontal upper surface 13b formed on the load attaching member 13 on the movable element 3 side.

A position detecting mechanism 20 for detecting a movement position of the movable element 3 is disposed between an inside surface of an upper edge 11U of the coil frame 11 of the movable element 3 and the support plate 15 on the anchoring element 2 side. The position detecting mechanism 20 has a light-emitting part 22 provided with an LED 21, and a light-receiving part 24 provided with a semiconductor position sensitive detector (PSD) 23. The light-emitting part 22 is attached to the inner peripheral surface of the upper edge 11U of the coil frame 11. The light-receiving part 24 is mounted on a circuit substrate 25 attached to an upper surface of the support plate 15. In order to establish an electrical connection with the light-emitting part 22 on the movable side, a flexible cable 26 is extended in a bent state between the light-emitting part 22 on the movable side and the circuit substrate 25 on the anchored side.

Upper parts of the anchoring element 2 and movable element 3 on which the position detecting mechanism 20 is disposed are covered by a rectangular solid-shaped light-shielding sensor case 27 that is open on a lower part. An external connecting wiring substrate 28 is attached to an outside surface of the left outer yoke 4L. Wiring 28a extending from the circuit substrate 25 is connected to the wiring substrate. An external connecting connector 29 is mounted on the wiring substrate. In contrast, lower parts of the anchoring element 2 and movable element 3 are left in an open state. Air comes directly into contact with the driving coil 12 of the moving movable element 3 when the movable element is driven because the lower part of the movable element 3 is left open. Therefore, a benefit is presented in that the driving coil 12 will be efficiently cooled.

As can be seen from FIG. 3, the linear guide rail 14a of the linear guide 14 is disposed so as to be positioned on the central axial line 3a when the linear actuator 1 of the present embodiment is cut in a plane perpendicular to the central axial line 3a of the movable element 3. The position detecting mechanism 20 and load attaching member 13 that sandwich the linear guide 14 are disposed in linear fashion in the vertical direction. Disposing these members in such a manner will result in a center of gravity of the movable element 3 being matched with a center of the linear guide 14. In addition, the magnetic circuit is in a bilaterally symmetrical relationship with regard to the center of the movable element 3. Therefore, a center of a thrust force that acts upon the movable element 3 will be matched with the center of the movable element 3. Therefore, in the present embodiment, the center of the thrust force that acts upon the movable element 3, the center of gravity of the movable element 3, and the center of the linear guide 14 are positioned at the center of the movable element 3.

The center of gravity of the movable element 3 is matched with the center of the linear guide 14. Therefore, momentum that is generated by the weight of the movable element and that acts upon the linear guide 14 can be reduced. In addition, momentum generated by the thrust force that acts upon the linear guide 14 can be reduced because the center of the thrust force that acts upon the movable element 3 is matched with the center of the linear guide 14. Therefore, in the linear actuator 1 of the present embodiment, unreasonable stress can be prevented from being placed on the linear guide 14 or can be minimized, and resistance to sliding in the movable element 3 due to the linear guide 14 can be reduced. As a result, the movable element 3 can be moved with high responsiveness and can be positioned with favorable precision. The durability of the linear actuator 1 can also be improved because unreasonable stress is not placed on the linear guide 14 and the like.

In the linear actuator 1 of the present embodiment, the protruding parts 41, 42 that protrude inward are formed on the front and rear ends of the inside surfaces of the left and right outer yokes 4L, 4R, and the permanent magnets 5L, 5R are attached to the concave part 43 formed between the protruding parts. The inner yokes 6L, 6R are attached to the distal end surfaces of the front and rear protruding parts 41, 42. The left and right perpendicular edges (11L, 12L, 11R, 12R) of the movable element 3 move forward and rearward in the gaps 7L, 7R formed by the permanent magnets, front and rear protruding parts, and inner yokes.

In this configuration, the front and rear moving positions of the movable element 3, which moves through the gaps 7L, 7R, are regulated by inside end surfaces 41a, 42a of the front and rear protruding parts 41, 42 of the outer yokes 4L, 4R. The description that follows is provided with reference to FIG. 4(c). When the movable element 3 moves forward, the front edge 11a of the coil frame 11 makes contact with the inside end surface 41a of the front protruding part 41. When the movable element 3 moves rearward, the rear edge 11b of the coil frame 11 makes contact with the inside end surface 42a of the rear protruding part 42.

A mechanism for stopping the movable element 3 is thus formed by the front and rear edges 11a, 11b of the coil frame 11 and the inside end surfaces 41a, 42a of the front and rear protruding parts 41, 42. Therefore, a separate member need not be attached as a mechanism for stopping the movable element 3. Therefore, benefits are presented in that the linear actuator 1 will be lighter and smaller. In the present embodiment, in order to cushion a shock during impact, rubber plates 31 or other elastic members (shock-absorbing members) are attached to the front and rear inside end surfaces 41a, 42a, as can be seen from FIG. 4(c).

Figure 5A:
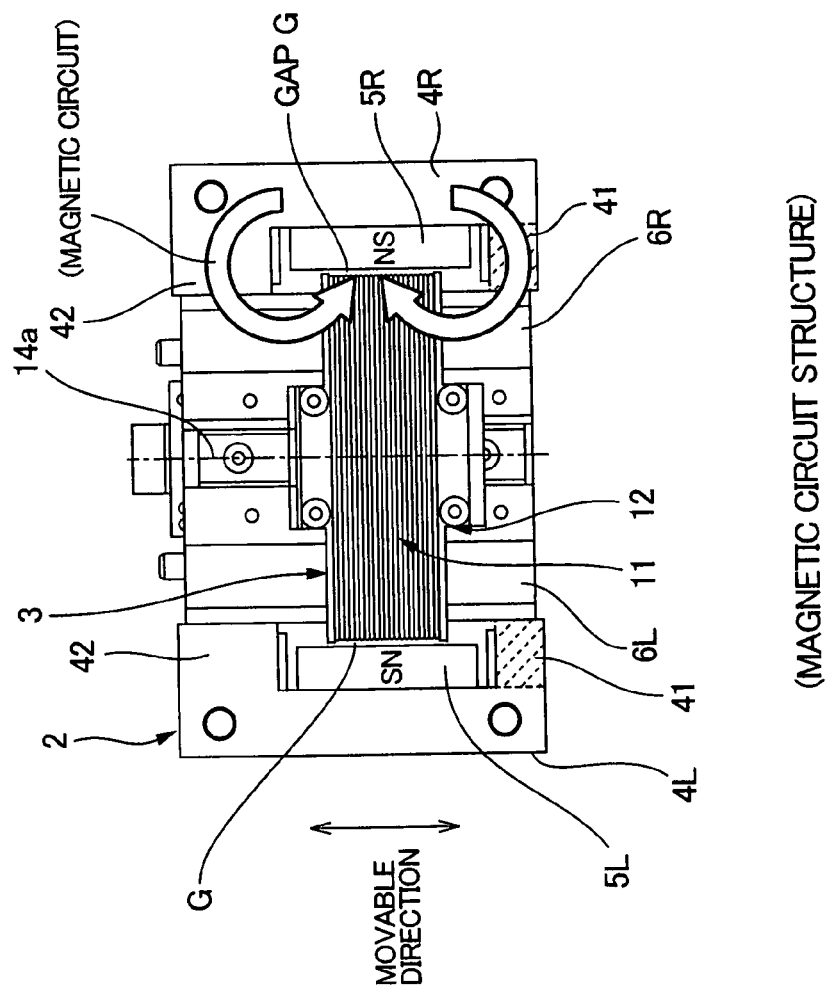
FIG. 5(a) is a descriptive view showing a structure of a closed magnetic path of the linear actuator of FIG. 1
Figure 5B:
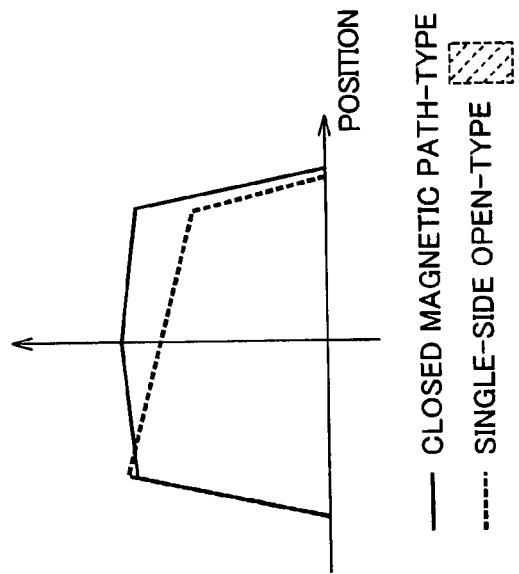
FIG. 5(b) is a descriptive view showing thrust force variations of the closed type and single-side open-type magnetic circuits.

In the present embodiment, the outer yokes 4L, 4R and inner yokes 6L, 6R are mutually bonded at front and rear end parts. Therefore, a closed magnetic circuit is formed. In other words, a closed magnetic circuit is formed that passes from the permanent magnets 5L, 5R through the outer yokes 4L, 4R, passes from the front and rear protruding parts 41, 42 of the outer yokes and through the inner yokes 6L, 6R, and then returns to the permanent magnets 5L, 5R, as shown in FIG. 5(*a*). When this closed magnetic circuit is formed, a fixed thrust force is obtained regardless of the movement position of the movable element 3.

For example, in instances that make use of an outer yoke that is open on one side and in which the front protruding part 41 shown by the diagonal line in FIG. 5(*a*) is omitted, in the single-side open-type outer yoke (broken line), the thrust force decreases when the movable element 3 faces the open side, as shown in FIG. 5(*b*). In contrast, when the closed magnetic path type (solid line) of the present embodiment is used, thrust force variation is extremely rare even when the movable element 3 moves forward and rearward. In addition, in the anchoring element 2 of the closed magnetic path-type, the portion where a gap G is formed between the permanent magnets 5L, 5R and the left and right perpendicular edges 12L, 12R of the driving coil 12 is more rigid than in the single-side open-type. Therefore, the gap G can readily be made smaller. This presents a benefit in that less heat will be produced.

Figure 6A:
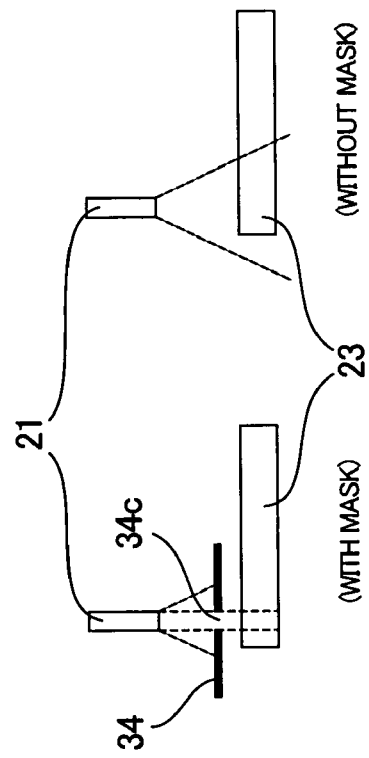
FIG. 6(a) is a descriptive view showing a position detecting mechanism of the linear actuator of FIG. 1
Figure 6B:
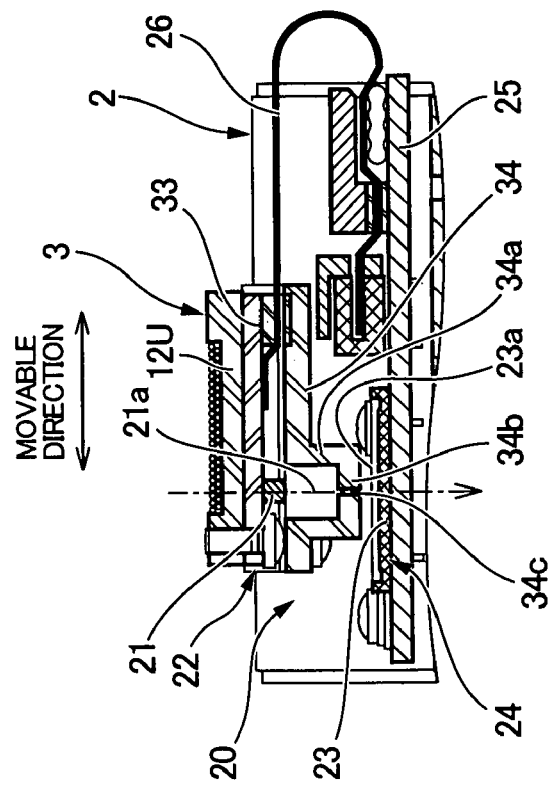
FIG. 6(b) is a descriptive view showing the effect of the mask.

A structure of the position detecting mechanism 20 of the linear actuator 1 shall next be described in detail with reference to FIG. 6. The light-emitting part 22 of the position detecting mechanism 20 is anchored to an inner peripheral surface of the upper edge 12U of the coil frame 11 of the movable element 3, as shown in FIG. 6(*a*). The light-emitting part 22 comprises an LED substrate 33 anchored to the inner peripheral surface of the upper edge 12U. The LED 21 is mounted on the LED substrate 33 in a downward facing state. The LED 21 is covered by a mask 34 attached to the LED substrate 33.

The mask 34 comprises a cylindrical part 34*a* extending coaxially with a central optical axis 21*a* of the emitted light from the LED 21, and a sealing part 34*b* that seals a distal end of the cylindrical part 34*a*. A slit 34*c* that has a fixed width, is oriented in a direction perpendicular to the movement direction of the movable element 3 (a direction perpendicular to the central axial line 3*a*), and extends horizontally is formed on the sealing part 34*b* as an extension along the central optical axis 21*a*. Therefore, emitted light from the LED 21 passes through the slit 34*c*, becomes linear illuminating light of narrow width, and illuminates a light-receiving surface 23*a* of the semiconductor position sensitive detector 23 of the light-receiving part 24 on the anchored side.

The light-receiving surface 23*a* of the semiconductor position sensitive detector 23 is disposed horizontally in an upward facing state along the movement direction of the movable element 3. A current value output from both ends of the semiconductor position sensitive detector 23 changes in accordance with the position of the center of gravity of light illuminating the light-receiving surface 23*a*. The position of the center of gravity of the illuminating light can be obtained on the basis of these changes.

In the present embodiment, illuminating light from the LED mounted on the movable element directly illuminates the light-receiving surface of the semiconductor position sensitive detector without passing through a reflective member, transmissive member, or the like. Therefore, error factors caused by passage through a reflective member or a transmissive member are non-existent, for which reason the detection output will have lower drift, and higher precision can be achieved.

Emitted light from the LED 21 becomes linear illuminating light via the slit 34*c* and illuminates the light-receiving surface 23*a*. As a result, when light-receiving surfaces 23*a* of equal lengths are used, the detection range of the semiconductor position sensitive detector 23 can be made greater than when the illuminating light from the LED 21 illuminates the light-receiving surface 23*a* without being altered. In other words, when the LED 21 is positioned on the end of the light-receiving surface 23*a*, linear illuminating light L1 does not deviate from the light-receiving surface 23*a*, as shown in FIG. 6(*b*). However, when emitted light from the LED 21 illuminates without being altered, some of the illuminating light deviates from the light-receiving surface 23*a*, the position of the center of gravity of the light illuminating the light-receiving surface 23*a* is dramatically displaced, and detection becomes impossible.

Figure 7:
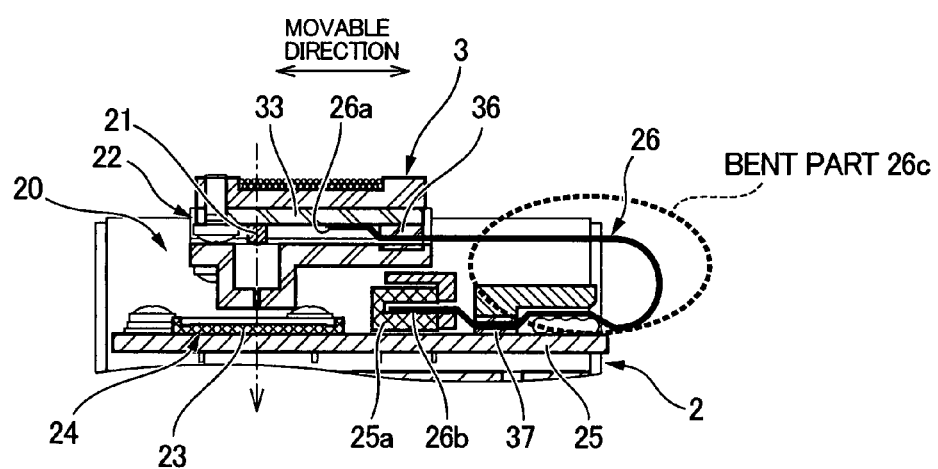
FIG. 7 is a descriptive view showing a method for anchoring a flexible cable of the linear actuator of FIG. 1.

The flexible cable 26 extends between the LED substrate 33 of the light-emitting part 22 and the circuit substrate 25 on the anchored side, and an electrical connection is established by the flexible cable 26. A method for anchoring the flexible cable 26 shall be described with reference to FIG. 7. One end 26*a* of the flexible cable 26 is anchored to a connecting terminal of the LED substrate 33 on the movable side by soldering or the like. The other end 26*b* is anchored to a connector 25*a* mounted on the circuit substrate 25 on the anchored side.

In order to avoid interference with the movement of the movable element 3, the flexible cable 26 comprises a bent part 26*c* that extends from the end 26*a* on the movable side, extends along the movement direction, bends downward, once again extends in the movement direction, and reaches the other end 26*b*. A region between the bent part 26*c* and the end 26*a* on the movable side is anchored to the LED substrate 33 while being clamped from above and below by anchoring rubber 36. Similarly, a region between the bent part 26*c* and the end 26*b* on the anchored side is anchored to the circuit substrate 25 while being clamped from above and below by anchoring rubber 37.

Therefore, according to the anchoring rubbers 36, 37 a force that acts upon the bent part 26*c* of the flexible cable 26 will not be directly transmitted to the end 26*a* on the movable side or the end 26*b* on the anchored side. Thus, the force that acts upon the ends 26*a*, 26*b* is cushioned by the anchoring rubbers 36, 37. Therefore, the bent part 26*c* can be bent so as to be highly curved, and the connecting parts of the flexible cable can be made more reliable.

Other Embodiments

In the above-described embodiment, a rectangular tubular-shaped movable element is used. However, a movable element having a shape other than a rectangle can also be used. For example, a tubular movable element having a triangular cross section, or a cylindrical movable element can also be used.

In the above-described embodiment, an example was given in which the load attaching member 13 is a lens holder. However, it shall be apparent that the linear actuator of the present invention can be used in order to make a member other than a lens movable in a linear and reciprocating fashion.

The invention claimed is:

1. A linear actuator having:
   a rectangular tubular-shaped movable element in which a driving coil is wound around an outer peripheral surface of a rectangular tubular-shaped coil frame in a peripheral direction thereof; and
   an anchoring element in which left and right outer yokes are disposed perpendicularly, left and right magnets are attached to inner sides of the left and right outer yokes so as to face left and right perpendicular edges of the driving coil with a fixed gap, and left and right inner yokes are disposed inside the movable element so that they are disposed opposite the left and right magnets between which left and right perpendicular edges of the movable element are disposed; wherein an excitation current of the driving coil is controlled, whereby the movable element is moved in linear fashion in a direction of a central axial line of the movable element, the linear actuator comprising:

a support plate that extends along the central axial line between the left and right inner yokes inside the coil frame and that is attached to the inner yokes so that they form an H-shaped structure;

a linear guide that is disposed inside the coil frame, and that supports the movable element so as to allow movement along the central axial line thereof;

a load attaching member attached to an inner peripheral surface of the coil frame; and a position detecting mechanism disposed inside the coil frame in order to detect a movement position of the movable element; wherein the linear guide has a linear guide rail anchored to a surface of the support plate, and a linear guide block that can be moved linearly along the linear guide rail and is anchored to an upper surface formed on the load attaching member;

the position detecting mechanism has a light-emitting part attached to an inner peripheral surface of an upper edge of the coil frame, and a light-receiving part mounted on a circuit substrate attached to an upper surface of the horizontal support plate;

when the linear actuator is cut in a plane perpendicular to the central axial line of the movable element, the linear guide rail is positioned on the central axial line; and the load attaching member, linear guide, support plate, and position detecting mechanism are linearly arranged; and a center of gravity of the movable element and a center of the linear guide are matched with one another.

2. The linear actuator according to claim 1, characterized in that a center of a thrust force that acts upon the movable element and the center of gravity of the movable element are matched with one another.

3. The linear actuator according to claim 1, characterized in that protruding parts are formed on inside surfaces of the outer yokes by causing both end parts of the outer yokes in the movement direction of the moveable element to protrude toward the movable element, and an area between the protruding parts is a concave part having a fixed depth and having a width that encompasses a range of movement of the movable element;

the respective magnet is attached to the respective concave part, both end parts of an outside surface of the inner yokes are attached from the inside to the protruding parts on both sides;

the coil frame and driving coil of the movable element are disposed so as to pass through a gap formed between the magnets and the outside surfaces of the inner yokes; and closed magnetic paths are formed that pass from the magnets and through the outer yokes, pass from both of the protruding parts and through the inner yokes, and return to the magnets.

4. The linear actuator according to claim 3, characterized in that an edge part of the coil frame can come into contact with end surfaces of the protruding parts of the outer yokes on the concave part side when the movable element moves a predetermined amount; and a mechanism for stopping the movable element is formed by the end surfaces of the protruding parts and the edge parts on both sides of the coil frames.

5. The linear actuator according to claim 4, characterized in that elastic members are attached to the portions of the respective end surfaces of the concave part that come into contact with the coil frame.

6. The linear actuator according to claim 1, characterized in that the light-emitting part of the position detecting mechanism is provided with an LED, and the light-receiving part thereof is provided with a semiconductor position sensitive detector; wherein a light-receiving surface of the semiconductor position sensitive detector is arranged in the movement direction of the movable element; and a position of a center of gravity of illuminating light from the LED for directly illuminating the light-receiving surface is detected.

7. The linear actuator according to claim 6, characterized in that an emission side of the LED is covered by a mask provided with a slit that has a fixed width and extends in a direction perpendicular to the movement direction of the movable element; and linear illuminating light that has passed through the slit illuminates the light-receiving surface of the semiconductor position sensitive detector.

8. The linear actuator according to claim 6, characterized in further comprising:

an electricity-supplying flexible cable extending in a bent state between the light-emitting part and the anchoring element; wherein one end of the flexible cable is a movable side connecting end that is connected to the light-emitting part, and the other end is an anchored side connecting end that is connected to the anchoring element;

a portion of the flexible cable between the movable side connecting end and the bent portion is anchored to the movable element via an elastic member; and a portion between the anchored side connecting end and the bent part is anchored to the anchoring element via an elastic member.

9. The linear actuator according to claim 6, characterized in that a position of the coil frame and driving coil where the light-emitting part of the movable element is attached is covered by a light-shielding sensor cover attached to the anchoring element; and an outer peripheral side at a position of the coil frame and driving coil where the load attaching part of the movable element is attached is in an open state.

* * * * *